March 16, 1926.
C. T. HANSEN
CAR SEAT
Filed Jan. 17, 1924
1,577,025
7 Sheets-Sheet 1
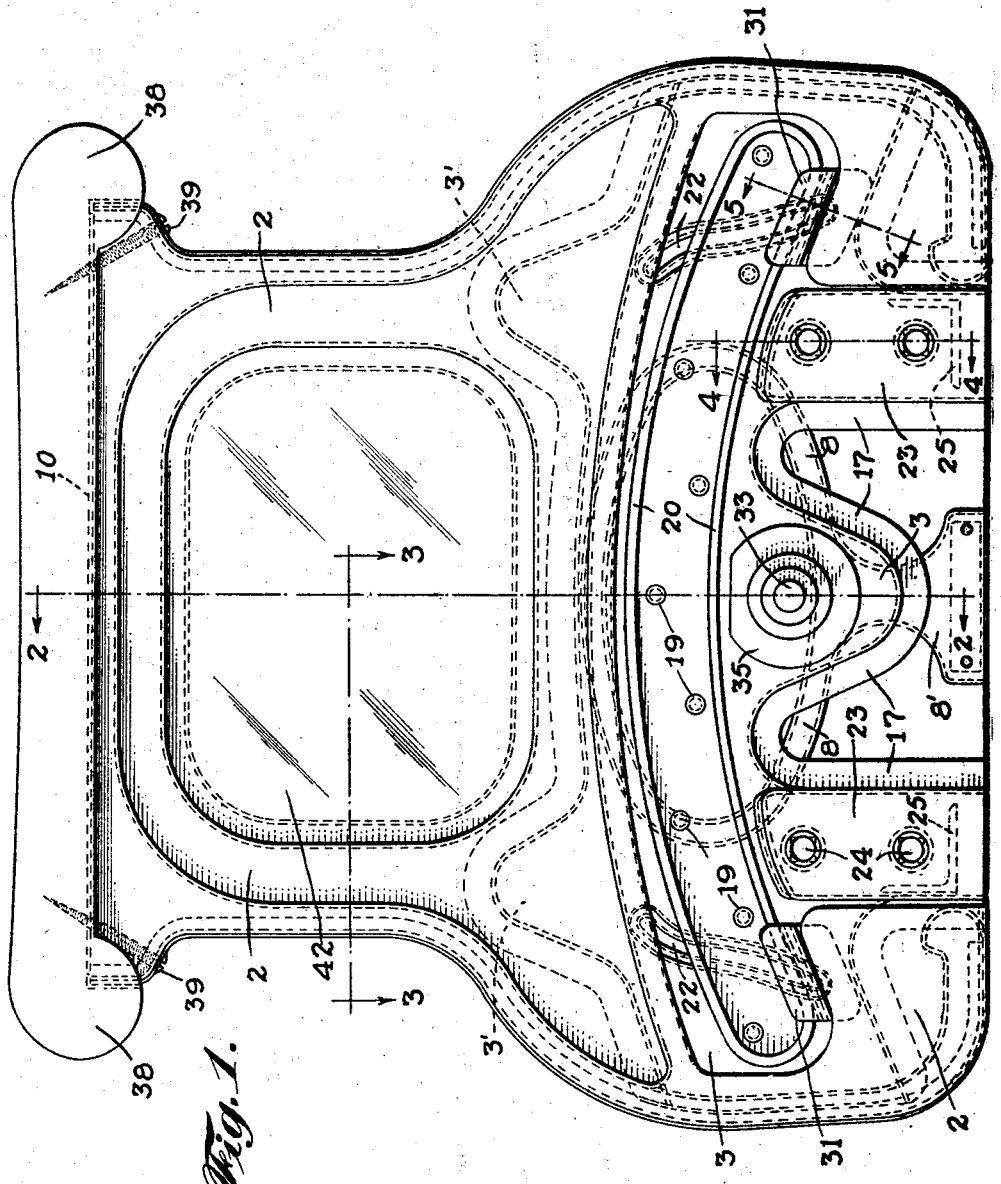
Fig. 1.
INVENTOR
BY
ATTORNEY

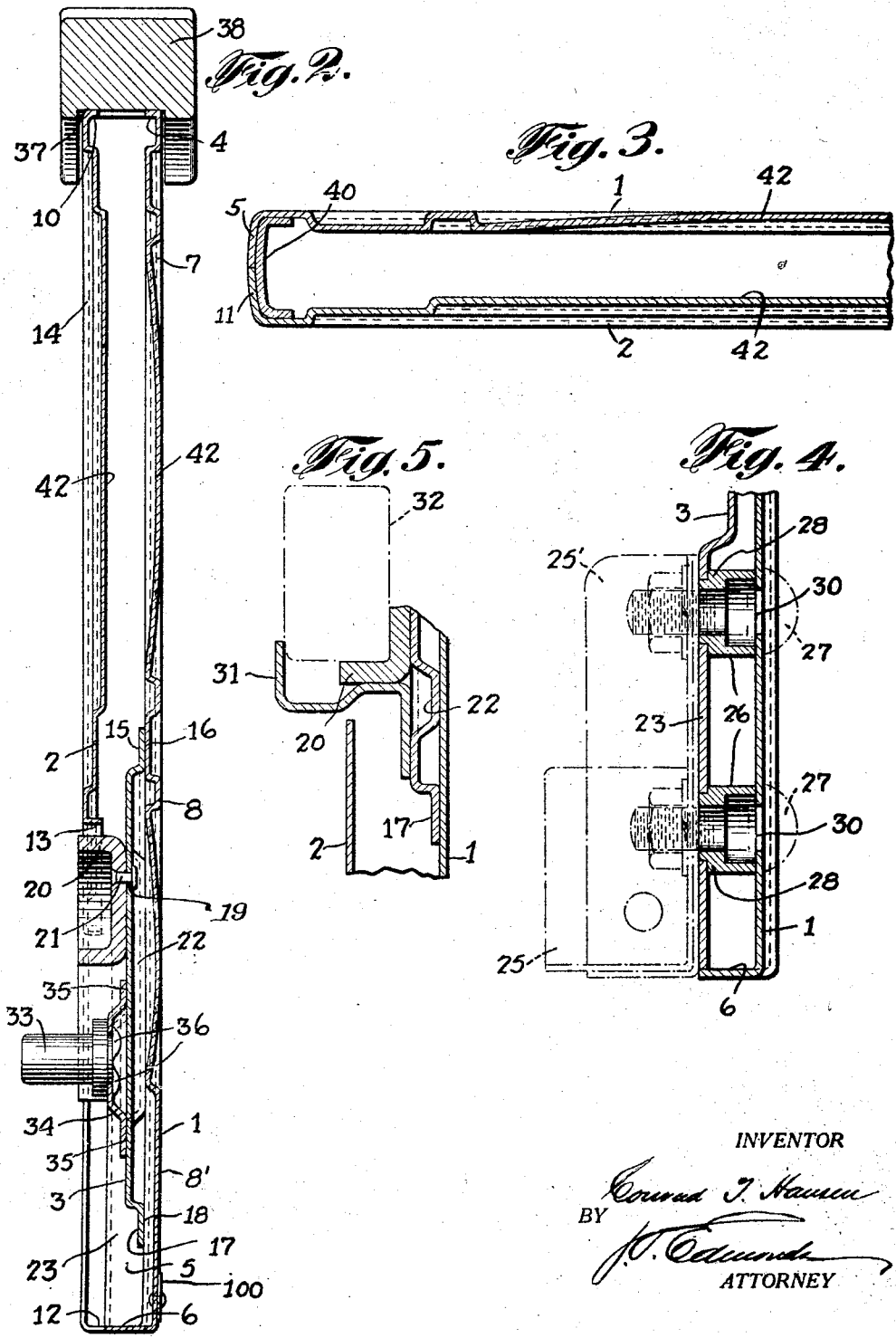

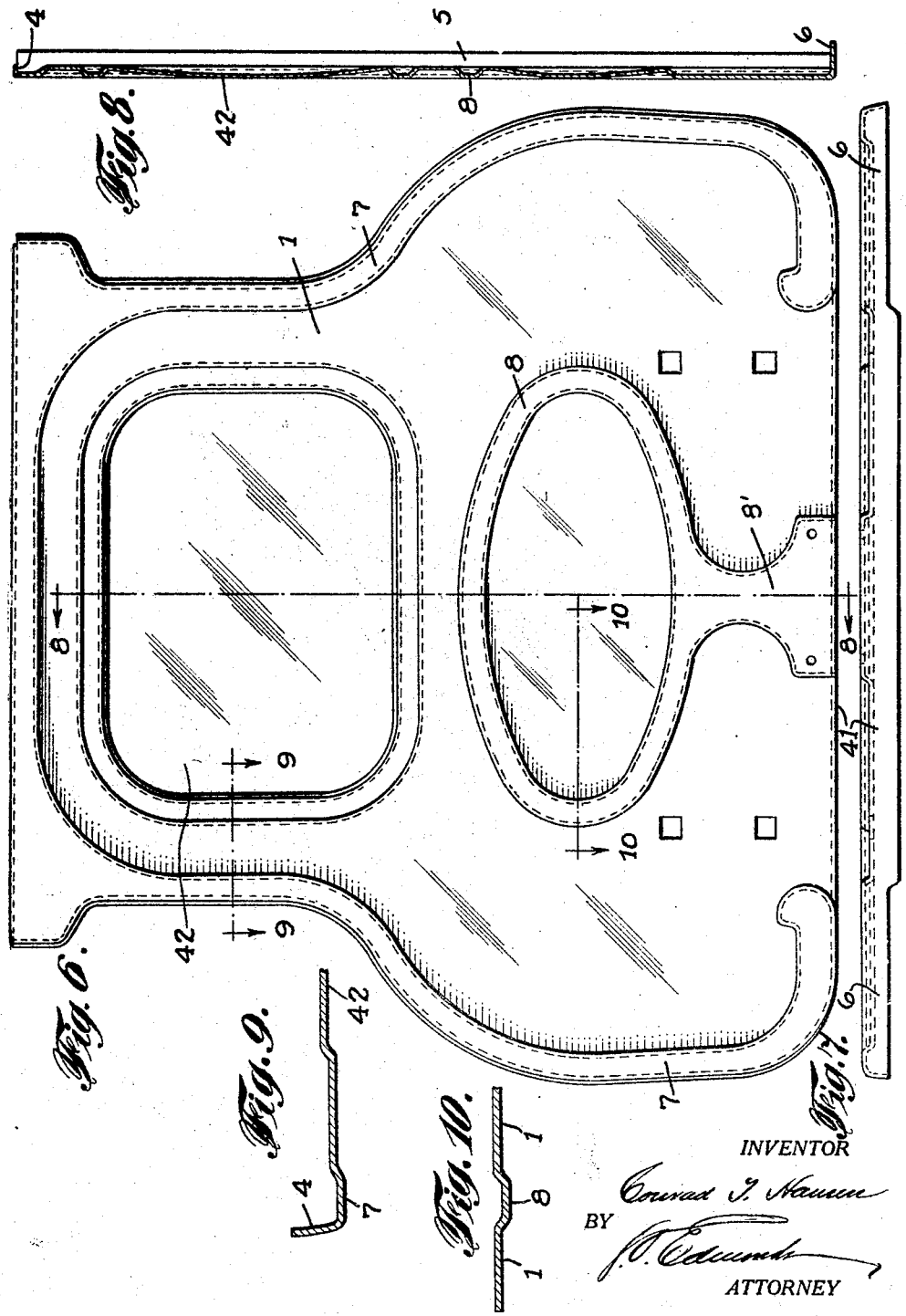

March 16, 1926. 1,577,025
C. T. HANSEN
CAR SEAT
Filed Jan. 17, 1924   7 Sheets-Sheet 4
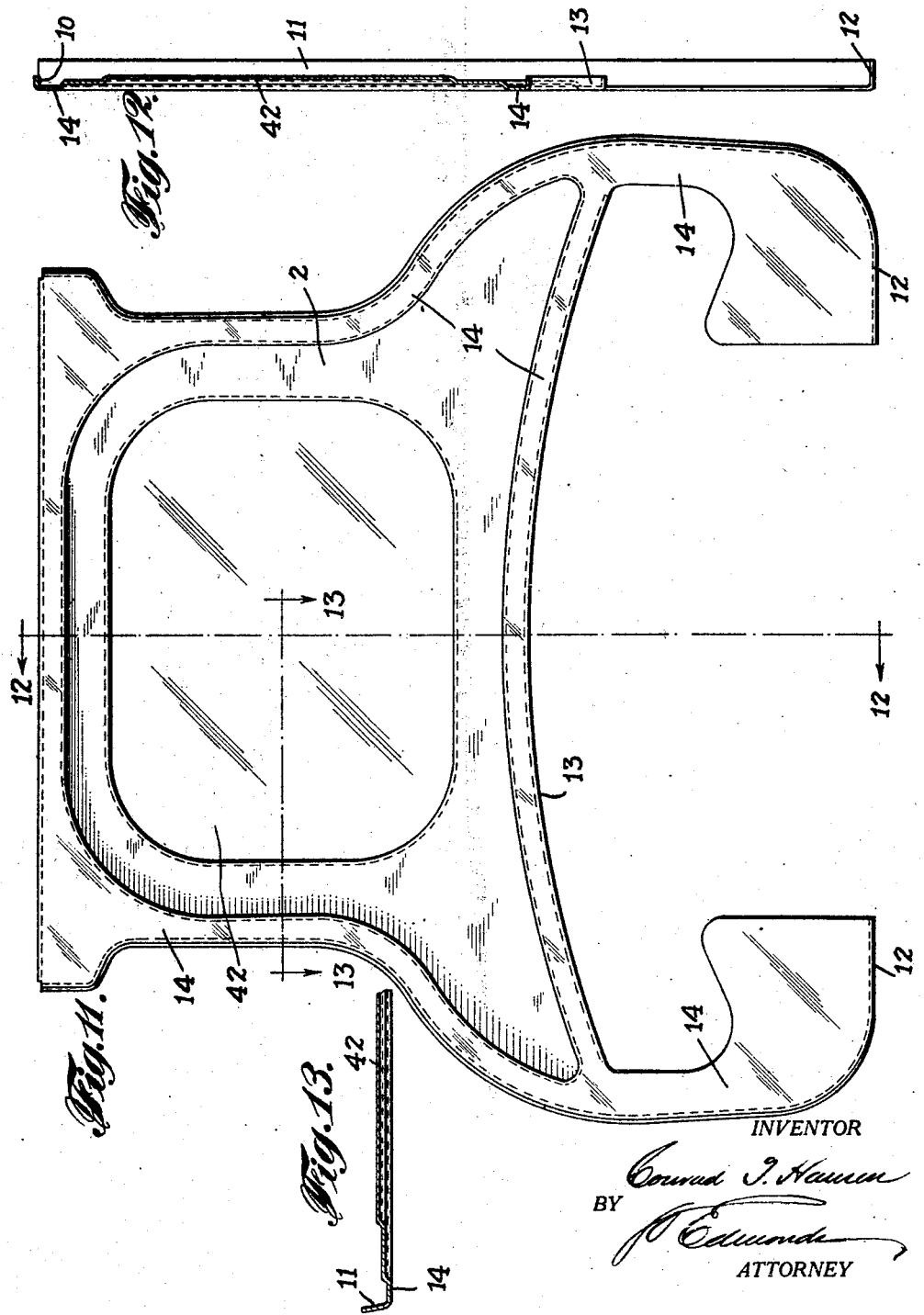

March 16, 1926.
C. T. HANSEN
CAR SEAT
Filed Jan. 17, 1924
1,577,025
7 Sheets-Sheet 5
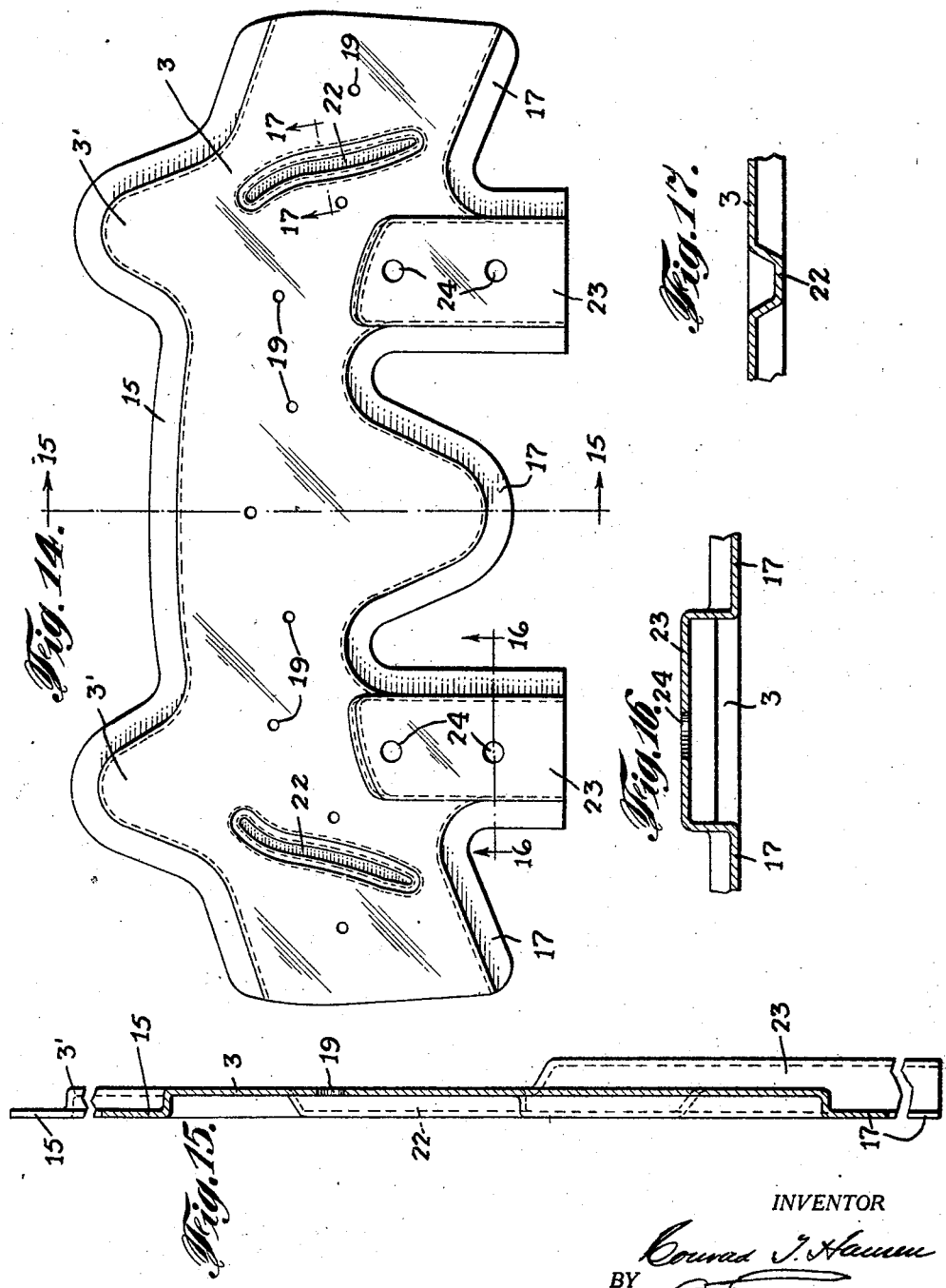
INVENTOR
Conrad T. Hansen
BY
ATTORNEY March 16, 1926.     C. T. HANSEN     1,577,025
CAR SEAT
Filed Jan. 17, 1924     7 Sheets-Sheet 6
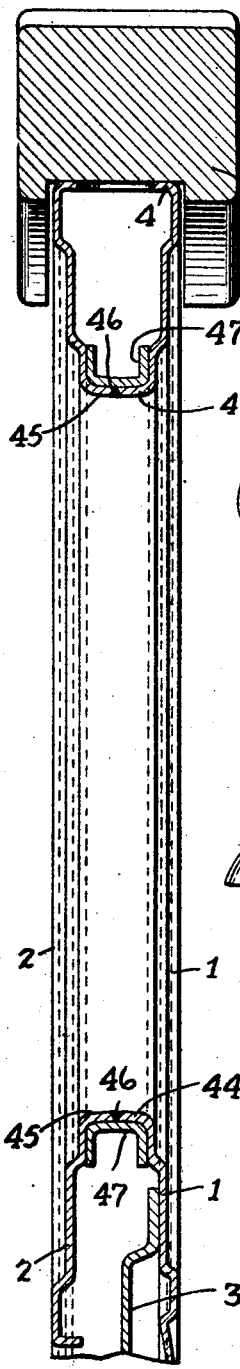
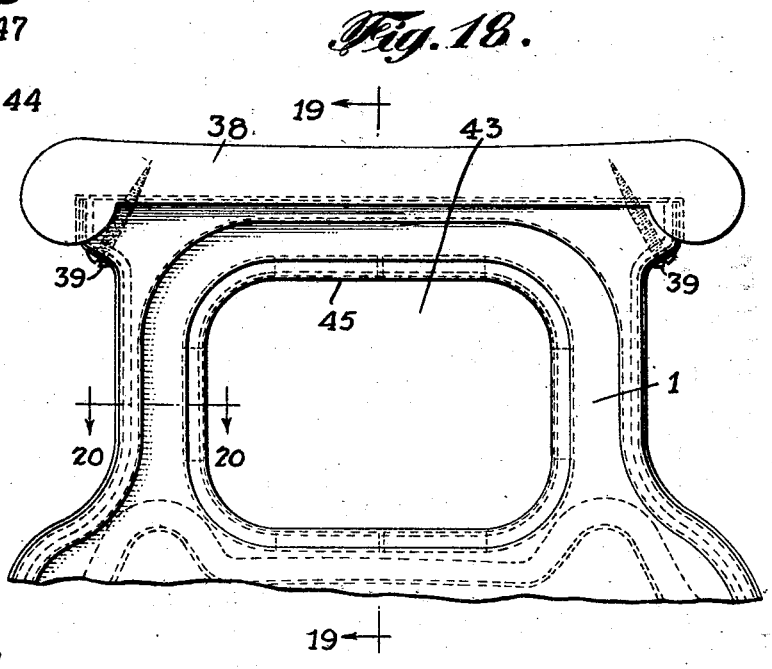
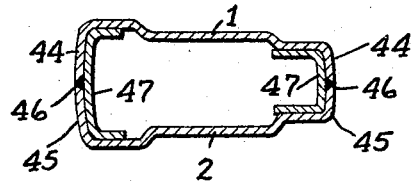
INVENTOR
Conrad T. Hansen
BY
ATTORNEY

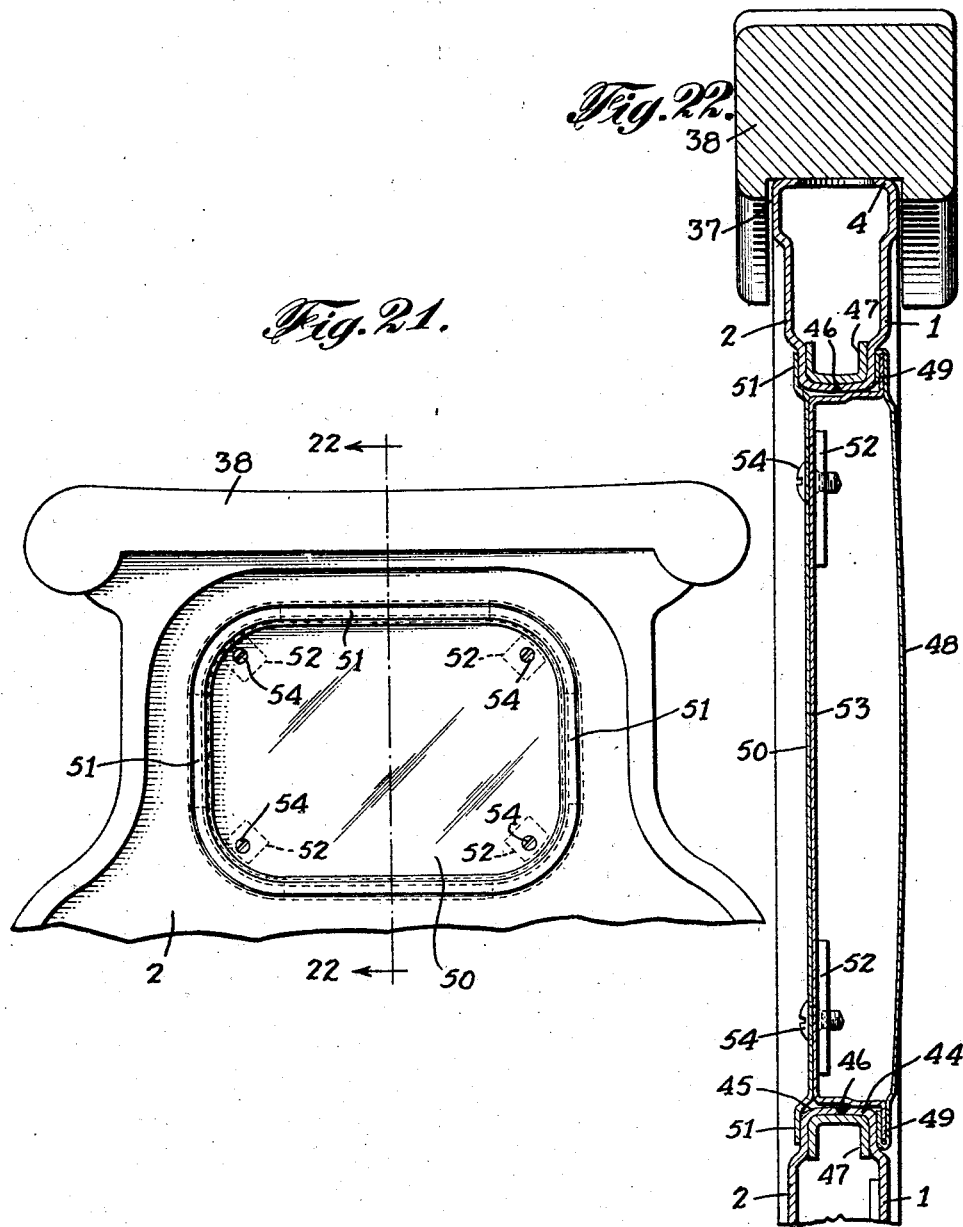

Patented Mar. 16, 1926.

1,577,025

UNITED STATES PATENT OFFICE.

CONRAD T. HANSEN, OF DETROIT, MICHIGAN, ASSIGNOR TO THE AMERICAN MOTOR BODY CORPORATION, OF PHILADELPHIA, PENNSYLVANIA, A CORPORATION OF DELAWARE.

CAR SEAT.

Application filed January 17, 1924. Serial No. 686,723.

*To all whom it may concern:*

Be it known that I, CONRAD T. HANSEN, a citizen of the United States, residing at Detroit, in the county of Wayne and State of Michigan, have invented certain new and useful Improvements in Car Seats, of which the following is a specification.

This invention relates to car seats, and more particularly relates to the seat end construction thereof. The principal object of my invention is to attain strength, simplicity and cheapness in seat end construction and at the same time to provide a seat end which is very attractive in appearance. A further object of my invention is to provide a seat end having a panel which may readily and easily be changed from an open type panel to a closed type panel. A further object of my invention is to provide a seat end which is adaptable for use with various types of seats. Another object of my invention is to provide a seat end construction which is sufficiently wide at the bottom to cover the mechanical parts of the seat construction and at the same time is sufficiently narrow at the top to give easy access to the seat, and to allow the occupant to swing around toward the aisle, if necessary. Other objects will be in part obvious and in part pointed out hereinafter.

The invention accordingly consists in the features of construction, combinations of elements and arrangement of parts which will be exemplified in the construction hereinafter set forth and the scope of the application of which will be indicated in the following claims.

In order that a clearer understanding of my invention may be had, attention is hereby directed to the accompanying drawings forming a part of this application and illustrating certain possible embodiments of my invention. Referring to the drawings, Fig. 1 is a side view of a seat end embodying my invention looking toward the inner surface thereof; Fig. 2 is a vertical sectional view of the same and is taken on the line 2—2 of Fig. 1; Fig. 3 is a horizontal sectional view of a portion thereof and is taken on the line 3—3 of Fig. 1; Fig. 4 is a sectional view of a portion of the construction and is taken on the line 4—4 of Fig. 1; Fig. 5 is a sectional view of another portion of the construction and is taken on the line 5—5 of Fig. 1; Fig. 6 is a side elevation of the outer plate of the construction; Fig. 7 is a bottom view of the same; Fig. 8 is a vertical sectional view thereof and is taken on the line 8—8 of Fig. 6; Fig. 9 is a horizontal sectional view of a portion thereof and is taken on the line 9—9 of Fig. 6; Fig. 10 is a horizontal sectional view of another portion thereof and is taken on the line 10—10 of Fig. 6; Fig. 11 is a side elevation of the inner plate of the construction; Fig. 12 is a vertical sectional view of the same and is taken on the line 12—12 of Fig. 11; Fig. 13 is a horizontal sectional view of a portion thereof and is taken on the line 13—13 of Fig. 11; Fig. 14 is a side elevation of the interior plate or spider member of the construction; Fig. 15 is a vertical sectional view of the same and is taken on the line 15—15 of Fig. 14; Fig. 16 is a sectional view of a portion thereof and is taken on the line 16—16 of Fig. 14; Fig. 17 is a sectional view of another portion thereof and is taken on the line 17—17 of Fig. 14; Fig. 18 is a side elevation of the upper portion of a seat end construction having a panel of the open type; Fig. 19 is a vertical sectional view of the same and is taken on the line 19—19 of Fig. 18; Fig. 20 is a horizontal sectional view of a portion thereof and is taken on the line 20—20 of Fig. 18; Fig. 21 is a side elevation of the upper portion of a seat end construction having an upper panel of the open type and in which the opening is closed by a removable cover member; and Fig. 22 is a vertical sectional view of the same and is taken on the line 22—22 of Fig. 21. Similar reference characters refer to similar parts throughout the several views of the drawings.

Referring to the drawings, the seat end constructions whether of the closed panel type or of the open panel type comprise an outer steel plate 1, an inner steel plate 2 and an interior plate or spider 3, these three members being permanently and rigidly secured together, preferably by welding. The plates themselves are preferably steel pressings.

The outer plate is formed with marginal flanges on all sides, such as top flange 4, side flanges 5 and bottom flange 6. It also may be formed with a marginal exterior offset or bead 7 and a central elliptical offset or bead portion 8, and with a lower central offset portion 8' to which a name plate 100 may be attached. These offset or bead portions reenforce and strengthen the construction and give an attractive appearance thereto. The inner plate 2 is of the same shape as the outer plate 1, except that a large T-shaped part of the lower portion thereof is cut away, as at 9. This inner plate also is formed with top flange 10, side flanges 11, bottom flanges 12, flange 13 along the cutout 9 and with marginal offset or bead portions 14. The interior plate or spider 3 has offset top flange 15 which is adapted to abut and to be welded to the interior surface of the outer plate 1, as at 16. This member also has lower flanges 17 which abut and are welded to the inner surface of the plate 1, as at 18. This spider member is also provided with suitably located rivet holes 19, permitting a channel track 20 for seat rollers 32 to be secured to the spider by means of rivets 21. This spider 3 is also formed with one or more offset formations 22 of scroll shape which strengthen the whole construction and which support the outer panel 1 during the process of welding and afterward. The spider 3 is also formed with a pair of suitably located offset surfaces 23 having suitable bolt holes 24, and the connecting rails 25 of the seat construction are intended to be connected directly with these portions of the spider 3. Preferably, behind the bolt holes 24 in the offset portions 23 are provided bearing members 26 (see Fig. 4) for the bolts 27 which hold the connecting rails 25, or the brackets 25' therefor, in place. These members 26 may be provided with annular shoulder portions 28 which abut the spider, while the other ends of the members 26 abut the outer panel 1, thus reenforcing and strengthening the construction. The outer panel 1 may have square perforations 29 in which square shank portions 30 adjacent the heads of the bolts will seat when the heads of the bolts are on the outside of the panel 1. If desired, steel guard plates 31 may be welded to the spider 3 at each end of the channel track 20 to prevent the back supporting rollers 32 from leaving the channel track. If desired, a rod ferrule 33 may also be connected with the spider, preferably in the lower center of this member. This may be accomplished by welding a channel shaped piece 34 to the spider, as at 35, and connecting the ferrule 33 thereto by means of rivets 36. There is space in the construction to raise or lower the position of this ferrule considerably, which is one of the features of the construction which renders it adaptable to various types of seats. Another feature which renders the construction adaptable to various types of seats is the track supporting portion of the spider which is adapted to support tracks of any radius, and renders the construction usable with seat backs having different inclinations. The bottom of the spider 3 at its center is so contoured as to permit free swing of an oscillating rod of the seat construction during seat reversal. The two projections 3' at the top of the spider add rigidity to the upper portion of the construction.

After the spider member 3 has been welded to the outer panel 1, the inner panel 2 is placed in position behind the spider 3 and is permanently and rigidly incorporated in the construction. The upper flange 4 of the outer member and the upper flange 10 of the inner member are preferably held together by being seated in the channel 37 of an arm-rest member 38 which is disposed on the tops of these members and which may be held in position thereon by means of screws 39 penetrating the side flanges of the inner and outer panels and entering the arm-rest 38 from below. The side flanges 5 of the outer panel meet the side flanges 11 of the inner panel, and they may be arc welded together where these edges meet. If desired, an inner channel member 40 may be used behind these flanges as a spacer and as a reenforcement. At the bottom of the construction the bottom flange 6 of the outer panel is abutted by the bottom flanges 12 of the inner panel for such distance as the flanges 12 extend, and arc welding may be employed to secure these flanges together. Intermediate the bottom flanges 12 the flange 6 of the outer panel may be extended inwardly, as at 41, to complete a bottom closure for the construction.

It will be seen that when these parts have been so assembled the channel track 20 for the back supporting rollers and the offset portions 23, to which the connecting rails are to be attached, are exposed on the interior of the construction, where the necessary connections with the seat mechanism may be readily effected.

The outer and inner panels are preferably made with lower portions which are wide enough to conceal all the mechanical parts of the seat and with upper portions which are narrow enough to permit easy access to the seat and to permit an occupant to swing around the seat end, if necessary.

If it is desired to have the upper portion of the seat construction of the closed type, then the upper portions of the inner and outer panel members are preferably closed, as at 42. This gives a permanently closed construction. If, however, an open type construction is desired, the upper portions of the inner and outer panel members are formed with openings, as at 43, and in such case the inner and outer panels are preferably formed with flanges, such as 44 and 45, which extend about the opening and meet each other at their edges where they may be joined together by arc welding or the like, as at 46. If desired, one or more channel members 47 may be welded in place behind these flanges to serve as spacers and as reenforcements for this portion of the construction.

I provide means for changing such open type construction to a closed construction by providing a separate, removable covering device which may readily and easily be clamped on the construction so as to cover this opening. In a preferred form, this cover member comprises a box like member 48, the body of which is adapted to seat within the opening from either side, and has a marginal flange portion 49 which abuts against that side of the construction about the opening. In conjunction with this box like member 48 I provide a panel 50 which has marginal flanges 51 adapted to abut against the construction at the opposite side of the opening. I secure a plurality of lugs 52 to the interior of the inserted box wall 53 of the box member and provide threaded apertures in these lugs and provide bolt holes in the panel 50, so that by means of screw bolts 54 the panel 50 and the box portion 42 may be clamped tightly against the seat end construction from opposite sides of the opening, in position to close this opening in the seat end panel. If an open type of seat end construction has been furnished and it is desired to change this to the closed type, it is only necessary to procure one of these closure devices and secure it in place. There is no need to disturb the original seat end construction in any way.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. In seat end construction of the character described, in combination, a metallic spider having offset attachment portions for connecting rails, a metallic outer panel covering said offset portions on the outside, and a metallic inner panel cut away at said attachment portions, said spider being disposed between said inner and outer panels, and said inner panel and said outer panel and spider being all secured together rigidly, substantially as described.

2. In seat end construction of the character described, in combination, a metallic spider having offset attachment portions for connecting rails and an intermediate space for a rod ferrule supporting member, a metallic outer panel covering said offset portions on the outside, and a metallic inner panel cut away at said attachment portions, said spider being disposed between said inner and outer panels, and said inner panel, outer panel, and spider being all secured together rigidly, substantially as described.

3. In seat end construction of the character described, in combination, a metallic spider having offset attachment portions for connecting rails and an intermediate space for a rod ferrule supporting member, and having a portion positioned and shaped to have secured thereto tracks for back supporting rollers, a metallic outer panel covering said offset portions on the outside, and a metallic inner panel cut away at said attachment portions, said spider being disposed between said inner and outer panels, and said inner panel, outer panel, and spider being all secured together rigidly, substantially as described.

4. In seat end construction of the character described, in combination, a metallic outer panel, a metallic spider seated against the inner surface of said outer panel and having marginal flanges secured thereto, the body of said spider being offset from said outer panel and comprising attachment portions for connecting rails, for a rod ferrule supporting member and for a track for back supporting rollers, and an inner panel secured to said outer panel over said spider, said inner panel being substantially the height and width of the outer panel and having a cut away portion at the attachment portions of the spider.

5. In seat end construction, in combination, an outer panel, an inner panel, the edges of said panels having oppositely directed flanges meeting each other edge to edge, and a channel shaped reinforcing and stiffening member between said panels and having its base disposed against and secured to said panel flanges, and having its side walls disposed against the side walls of said panels.

6. In seat end construction, in combination, an outer panel, an inner panel, a spider intermediate said panels, the edges of said panels being flanged over toward each other, the upper and lower edges of said spider having offset flanges abutting and secured to the rear surface of said outer panel, small offset reinforcing and supporting portions on the body of the spider abutting the rear surface of the outer panel, said spider having an attachment surface for a back standard track, and having a lower central attachment surface for a rod ferrule supporting member, and having attachment surfaces for seat rail brackets, said inner panel being substantially the height and width of the outer panel and having a T-shaped cut away portion at the said attachment surfaces of the spider.

7. In seat end construction, in combination, an outer panel, an inner panel, a spider intermediate said panels, the edges of said panels being flanged over toward each other, a channel shaped reenforcing and stiffening member between said panels and disposed against and secured to the edge flanges of both panels, the upper and lower edges of said spider having offset flanges abutting and secured to the rear surface of said outer panel, small offset reinforcing and supporting portions on the body of the spider abutting the rear surface of the outer panel, said spider having an attachment surface for a back standard track, and having a lower central attachment surface for a rod ferrule supporting member, and having attachment surfaces for seat rail brackets, said inner panel being substantially the height and width of the outer panel and having a T-shaped cut-away portion at the said attachment surfaces of the spider.

8. In seat end construction, in combination, an outer panel, an inner panel, a spider intermediate said panels, the edges of said panels being flanged over toward each other, the upper and lower edges of said spider having offset flanges abutting and secured to the rear surface of said outer panel, small offset reinforcing and supporting portions on the body of the spider abutting the rear surface of the outer panel, said spider having an attachment surface for a back standard track, and having a lower central attachment surface for a rod ferrule supporting member, and having attachment surfaces for seat rail brackets, said inner panel being substantially the height and width of the outer panel and having a T-shaped cut-away portion at the said attachment surfaces of the spider, said outer panel extending well above the spider and the upper edge of the spider having upwardly extending portions whereby the upper part of the outer panel is stiffened and braced.

9. In seat end construction of the character described, in combination, a seat end assembly having a central opening, a closure device adapted to be secured to said assembly in position covering said opening, and means for removably securing said device to said assembly in covering position, said device comprising two members each having covering portions and lateral flanges and adapted to be secured together over said opening with the flanges of said members overlapping the seat end from opposite sides, and means for detachably securing said members together.

10. In seat end construction of the character described, in combination, a seat end assembly having a central opening, a closure device adapted to be secured to said assembly in position covering said opening, and means for removably securing said device to said assembly in covering position, said device comprising two members each having covering portions and lateral flanges and adapted to be secured together over said opening with the flanges of said members overlapping the seat end from opposite sides, one of said members being in the form of a box and the body thereof being adapted to seat within said opening, and screw bolts engageable with the other cover member and with the inner wall of said box like member for drawing said members together against said assembly from opposite sides thereof.

This specification signed this 12th day of January 1924.

CONRAD T. HANSEN.